(12) United States Patent
Koister et al.

(10) Patent No.: US 8,924,419 B2
(45) Date of Patent: Dec. 30, 2014

(54) METHOD AND SYSTEM FOR PERFORMING AN AUTHORITY ANALYSIS

(75) Inventors: Jari Koister, Menlo Park, CA (US); Mike Micucci, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 12/987,942

(22) Filed: Jan. 10, 2011

(65) Prior Publication Data

US 2011/0246520 A1    Oct. 6, 2011

Related U.S. Application Data

(60) Provisional application No. 61/319,759, filed on Mar. 31, 2010.

(51) Int. Cl.
| | | |
|---|---|---|
| G06F 7/00 | (2006.01) |
| G06Q 10/10 | (2012.01) |
| G06Q 50/00 | (2012.01) |
| G06Q 30/02 | (2012.01) |
| G06F 17/30 | (2006.01) |

(52) U.S. Cl.
CPC ............. *G06Q 50/01* (2013.01); *G06Q 10/103* (2013.01); *G06Q 30/0282* (2013.01); *G06Q 10/101* (2013.01)
USPC .......................................... 707/771; 707/776

(58) Field of Classification Search
None
See application file for complete search history.

(56) References Cited

U.S. PATENT DOCUMENTS

| | | | |
|---|---|---|---|
| 5,317,507 A * | 5/1994 | Gallant ...................... 715/260 |
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,002 B1 * | 2/2001 | Roitblat .............................. 1/1 |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |

(Continued)

*Primary Examiner* — Usmaan Saeed
*Assistant Examiner* — Yu Zhao
(74) *Attorney, Agent, or Firm* — Ingrassia Fisher & Lorenz, P.C.

(57) ABSTRACT

Methods and systems for automatically determining, from a body of emails, blogs, and other documents, authors of the documents who are authorities on certain subjects, and what those subjects are. An intersection of the semantic footprints of documents by an author are deemed to be the derived skills footprint of the author. The derived skills footprints of many authors are compared with a user's query to determine who is the best person that could respond to the user.

15 Claims, 12 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0165780 A1* | 7/2005 | Omega et al. .......... 707/7 |
| 2006/0184481 A1* | 8/2006 | Zhang et al. .......... 706/45 |
| 2006/0248076 A1* | 11/2006 | Troy et al. .......... 707/5 |
| 2007/0050339 A1* | 3/2007 | Kasperski et al. .......... 707/3 |
| 2008/0172379 A1* | 7/2008 | Uehara et al. .......... 707/5 |
| 2009/0182723 A1* | 7/2009 | Shnitko et al. .......... 707/5 |
| 2009/0271391 A1* | 10/2009 | Kawale et al. .......... 707/5 |

\* cited by examiner

401 "My Apple computer does not want to go to sleep. Is there an Apple manual that I could read?"

402 "Can I sleep underneath an apple tree?"

403 "Whenever my computer goes to sleep, it crashes. It's an Apple computer."

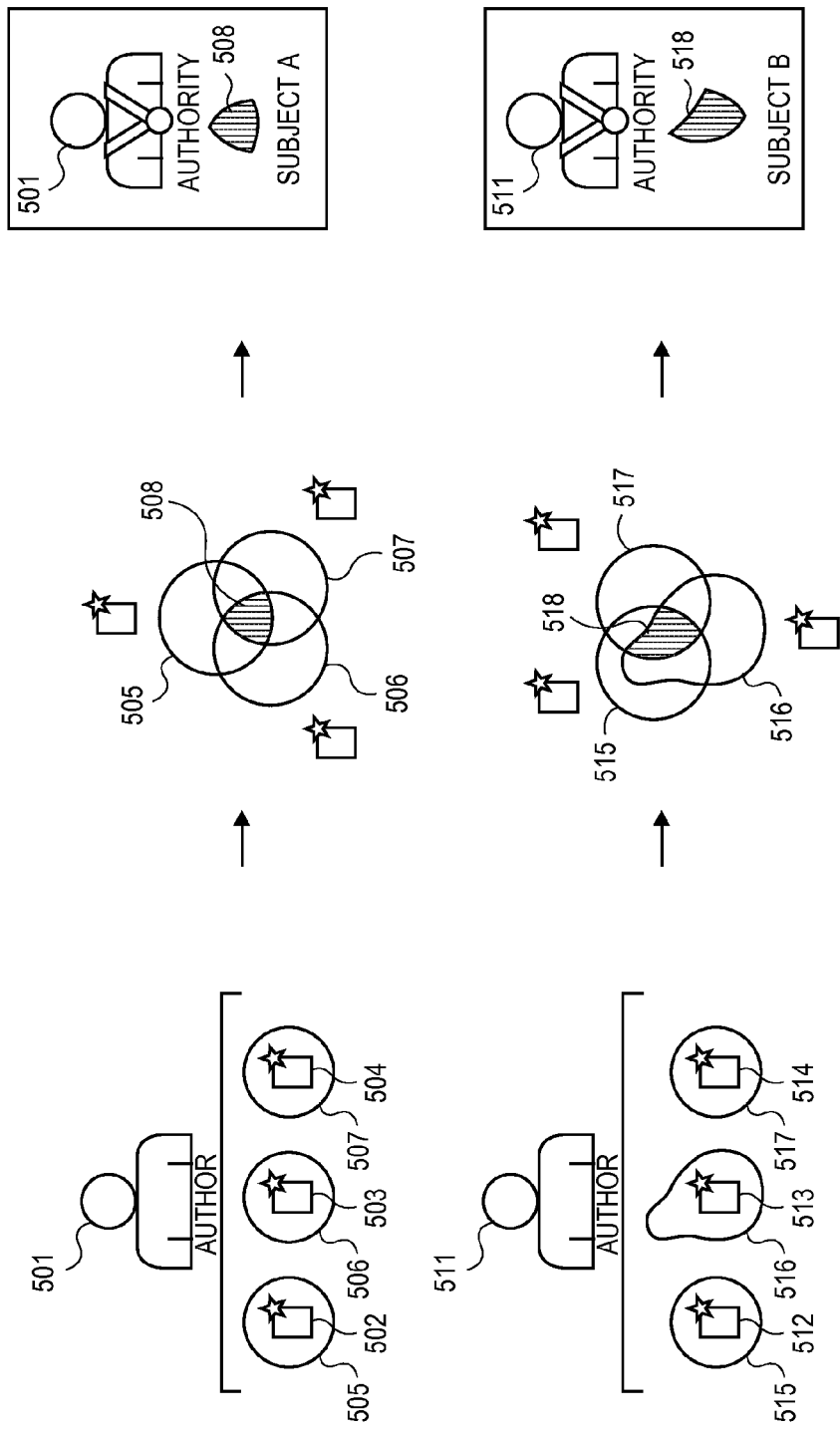

METHOD AND SYSTEM FOR PERFORMING AN AUTHORITY ANALYSIS

CROSS-REFERENCES TO RELATED APPLICATIONS

This application claims the benefit of U.S. Provisional Application No. 61/319,759, filed Mar. 31, 2010, which is hereby incorporated by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

The present invention generally relates to making recommendations in an online search, and more particularly to analyzing user authority for use in making recommendations for users of an on-demand database and/or application service.

2. Discussion of the Related Art

Performing a search online for a document is often simply a search for knowledge about a topic. Traditionally for an online search, a user types in keywords into a textbox and receives a results list with documents having the keywords. The documents in the results list can be sorted by the most relevant to the keywords, most popular (e.g., the number of incoming links to each document) and other factors for the user. The user then the scans results list and reads selected documents that might contain the information that he or she seeks.

This can be a time-consuming process for the user, especially if the user must scan many documents before finding one with the information sought. Keyword queries return documents that might be unrelated to the context of the search. For example, the keyword "apple" can refer to a fruit, computing machines produced by Apple Computer, Inc., the record company founded by the Beatles, etc. Even if contextual information is used to guess what the user refers to when he types "apple," unrelated documents can still be returned. For example, the keyword "apple" in the context of a "computer" can refer to machines produced by Apple Computer, Inc. or to the company itself. The array of unrelated, useless documents returned in a search can frustrate users. If a user knew that his co-worker in the next cubicle over was an authority on a subject, then the user might simply opt to ask his co-worker about it. Likewise, if a user knew that there was someone with which he could speak, he might opt to speak with that person rather than sorting through a bunch of documents. After all, the user may be searching for information about how to do something rather than a particular document.

Many online communities and social networks both identify and award their top members as a means to incentivize and drive social behavior. The purpose of the identification and awards is to reward participation, promote top users, and recommend connections to accelerate viral effects in creating a social network. This has been enormously effective in organizations with voluntary memberships. This has been slow to catch on in corporate social business networks.

In a corporate social business network, the purpose of "connecting users" is to accelerate users' abilities to get their work done. In those situations, conventional user recommendations are of little value. The reason is that the recommendations are sometimes focused on the communities' social aspects rather than what is necessary to connect users to conduct business.

A better way of obtaining information in corporate social business networks, and other networks, is needed.

BRIEF SUMMARY

Generally, methods and systems for determining who are authorities on subjects and what subjects are out there in a set of documents are presented. A set of documents are crawled and analyzed by a engine for their semantic footprints. Documents that are highly ranked by other users, read by many, or otherwise have some indication of a following are tagged as highly rated. If a person has authored many documents on a particular subject that are highly rated, then that person is deemed an authority on the particular subject. The subject's metes and bounds are quantified, for use in a computer, as the overlap or intersection of the semantic footprints of the documents. When another user enters a search query, the query is entered into the engine to determine the query's semantic footprint. If the semantic footprint of the query intersects with the semantic footprint of highly rated documents by the authoritative author, then the author's contact information is returned with search results as a possible authority on the user's question.

In some embodiments, a method of recommending an authority on a subject is performed. The method includes analyzing documents authored by an author for their semantic footprints, determining a first intersection of the documents' semantic footprints, and associating the first semantic footprint intersection with the author. The method further includes receiving a query from a user, analyzing the query for its semantic footprint, determining a second intersection, the second intersection being between the query's semantic footprint and the first semantic footprint intersection, and providing the user with information about the author based on an extent of the second intersection.

In some embodiments, a method of determining an authoritative author on a subject is provided. The method includes receiving a set of documents, each document having a semantic footprint, receiving user usage data for each of the documents, assigning a rating to each of the documents using the respective semantic footprint and user usage data for each document, and determining a common author of highly rated documents having an intersecting semantic footprint to establish an authoritative author of a subject. The method further includes receiving a query from a user, determining a semantic footprint of the query, determining that the semantic footprint of the query intersects with the semantic footprints of the highly rated documents, and providing the user with a name of the authoritative author based on a determination that the semantic footprint of the query intersects with the semantic footprints of the highly rated documents.

Embodiments also include machine readable storage mediums carrying instructions and computer systems, including an on-demand database service, executing instructions to perform the above methods.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 5 illustrates a determination of an authority of a subject in accordance with an embodiment.

DETAILED DESCRIPTION

Figure 1:
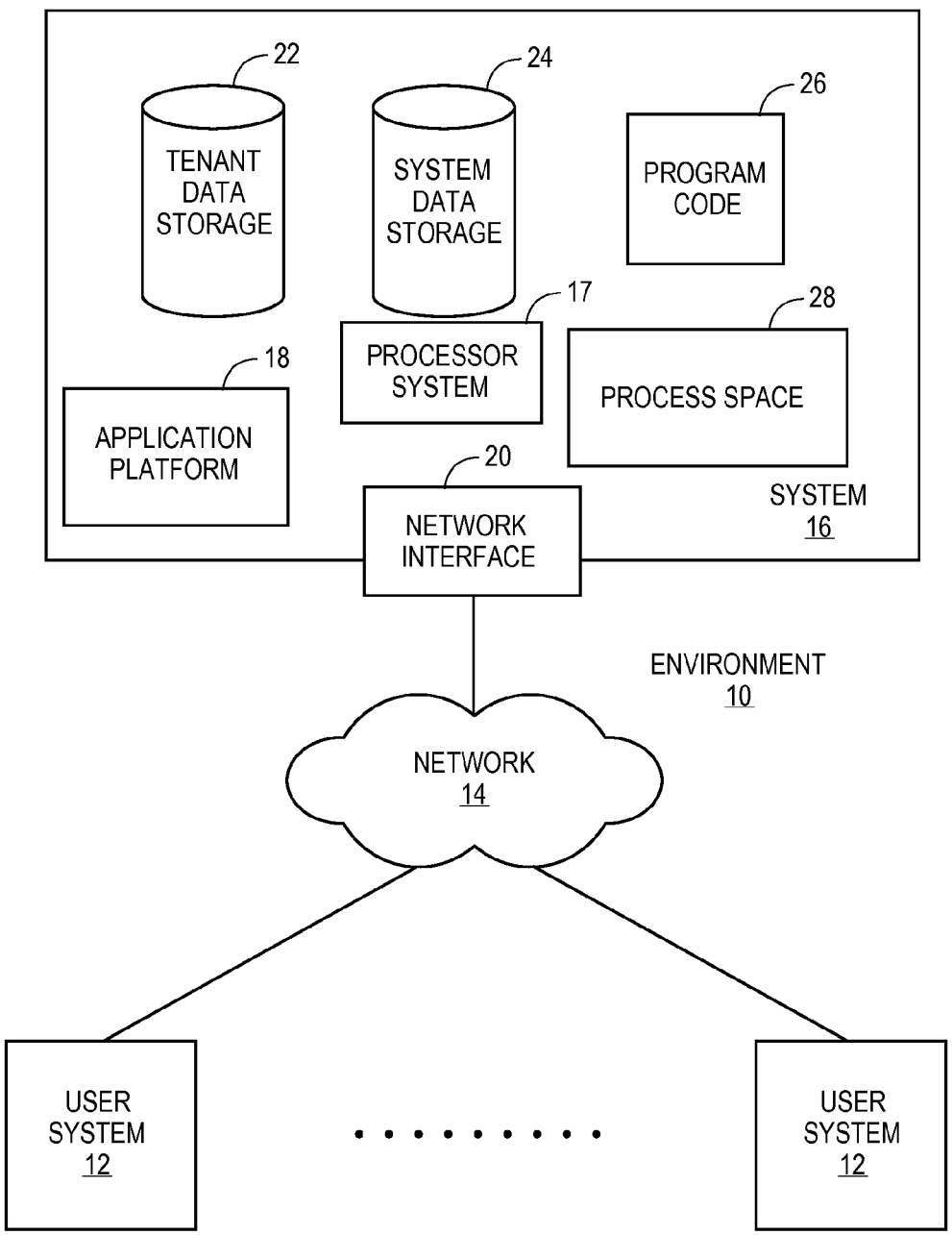
FIG. 1 illustrates a block diagram of an environment wherein an on-demand database service might be used.

Methods and systems for determining whether there are authoritative authors on subject(s) of a question or other query are generally presented. A body of documents is analyzed by an engine to determine their semantic footprints. Documents that are highly ranked by other users, read by many, or otherwise have some indication of a following are tagged as highly rated. If the same person has authored many documents that are highly rated, and the documents are related by subject, which is determined by their overlapping semantic footprints, then that person is deemed an authority on the particular subject. The overlapping semantic footprints of the documents are quantified as the person's derived skills footprint. When a user enters a search query, the query is entered into the same engine through which the documents were run in order to determine the query's semantic footprint. If the semantic footprint of the query intersects with the derived skills footprint of the author, then a link is provided to get in touch with the author.

Technical advantages of embodiments incorporating this approach include, but are not limited to, the following. (1) It can identify the unique skills and knowledge that users have and present them to other users as a way to guide a connection. This identification is done based on past user behavior and based on how other users have interacted with the user or the artifacts created by the user. (2) A user can find other users based on their derived skills and knowledge. (3) It can recommend users based on the recommended users' perceived skills and match that with needed skills. (4) The system can match open questions in a collaborative environment with the derived skills of users and suggest who can help resolve an open question. (5) A system can automatically forward open questions to users that have matching derived skills. (6) It can provide an earned community-based reputation based on specific expertise/skills. This reputation provides a level of trust in the recommendations and answers being valid. (7) The system can automatically identify expertise by topic across the community.

The methods and systems here are useful in corporate social settings, including those whose databases are hosted on an on-demand database service. On-demand database services are well suited for such technologies because the engine can be offered as an expedient service to clients. If a client wishes to know the best person for a job, the engine can be turned on to discover the knowledge and skills of its workforce without having to install software on its own hardware network.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

System Overview

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS)

or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
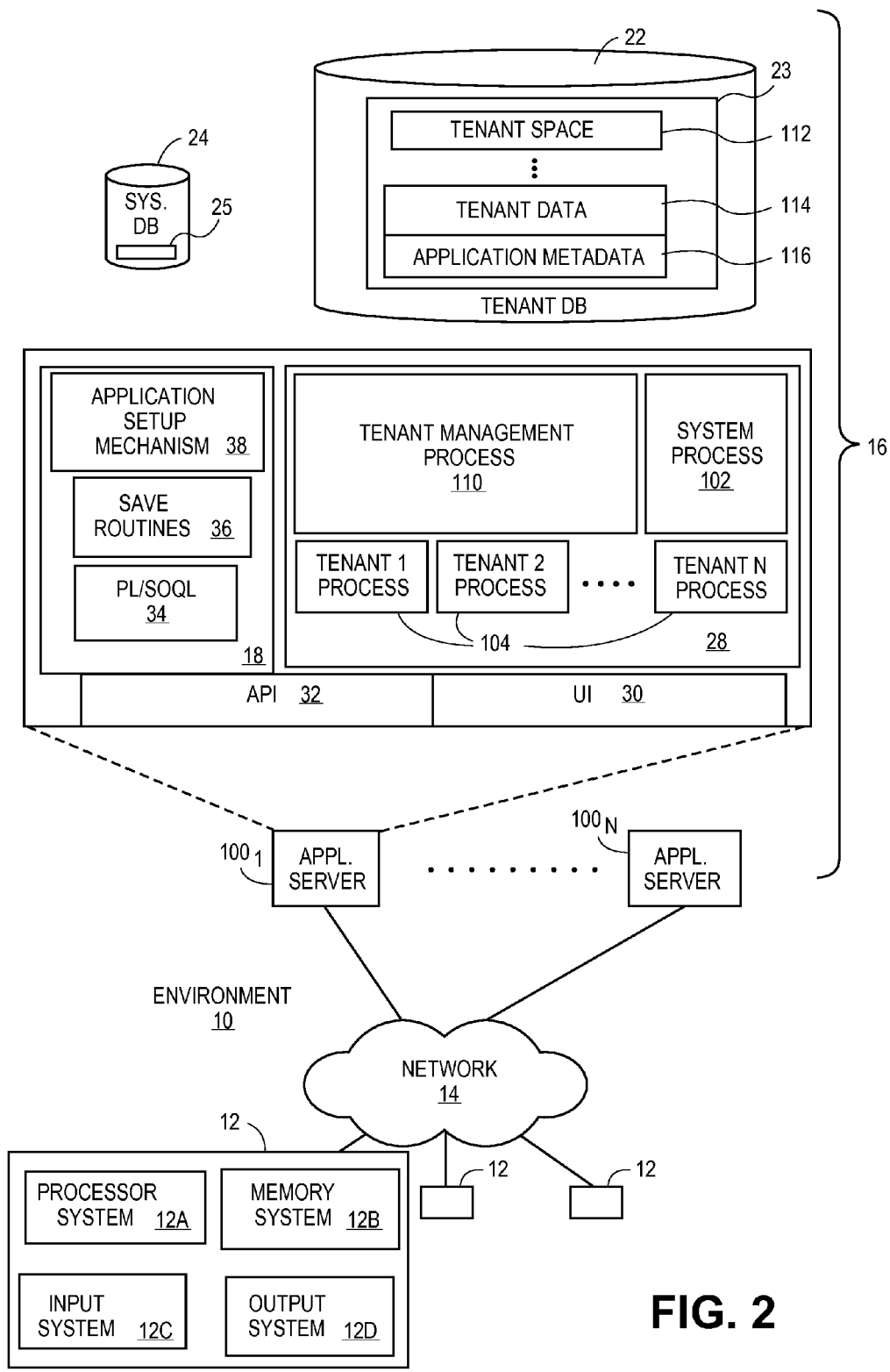
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828, 192 entitled "Programming Language Method and System for Extending APIs to Execute In Conjunction With an On-Demand Database Service," by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System," and which is hereby incorporated herein by reference, teaches systems and methods for creating custom objects as well as customizing standard objects in a multi-tenant database system.

Authority Analysis

Figure 3:
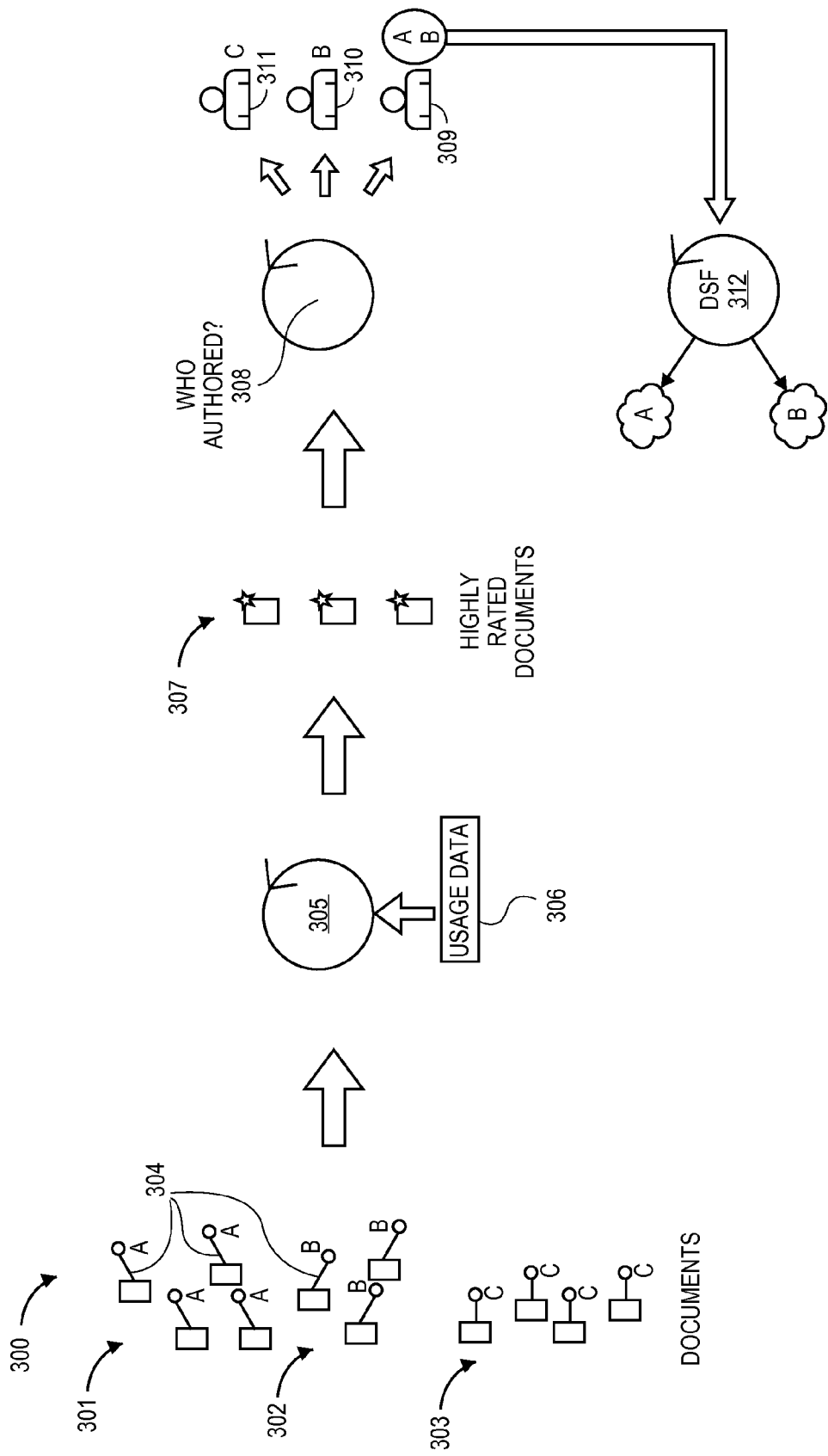
FIG. 3 illustrates a system for presenting an authoritative author of a subject in accordance with an embodiment.

FIG. 3 illustrates a system for presenting an authoritative author of a subject in accordance with an embodiment. In system 300, documents 301, 302, and 303 are analyzed to determine their respective semantic footprints 304. Documents 301, 302, and 303 can include documents such as Microsoft Word® documents, Adobe Acrobat® Portable File Document (PDF) documents, HyperText Markup Language (HTML) or other web pages, emails, instant messages, tweets, or any other verbal communications authored or otherwise created by a person.

Documents 301, 302, and 303 are fed into authority engine 305 along with user usage data 306. User usage data 306 includes data on how valuable the document is to the user community. For example, user usage data 306 includes information on how many other users have viewed each document, how often they view the document, how often and how many times they forward the document, how many times they recommend the document or bookmark the document for themselves, any subjective ratings by users of the quality of the document, and other measures. A subset of documents 301, 302, and 303 are determined as more highly rated than other documents, and the subset is referred to as highly rated documents 307. The ratings of documents, based on user usage data 306, can be determined through a scoring/rating engine. The item-scoring engine assigns a score/rating to an item. Higher ratings typically imply that the items/documents are considered more valuable by users.

Identification engine 308 determines who authored highly rated documents 307. If the semantic footprints of some of highly rated documents overlap, and those documents were written by the same person, then that person is considered an expert or authority on the overlapping subject matter in the documents. For example, author 311 has been determined to have written highly rated documents from the 303 document set. Thus, author 311 is considered as an authoritative author of the overlapping subject matter, C, of those documents. Author 310 is likewise considered an authoritative author of the overlapping subject matter in highly rated documents from the 302 document set, subject matter B.

One person can be an authority in multiple subjects. Author 309 has been determined to have authored highly rated documents of the 301 and 302 sets. Thus, author 309 is considered an authority on subjects A and B, which are the topics of documents 301 and 302, respectively. Author 310 may have independently written some of the documents in set 301 or may have co-authored the works with others (e.g., with author 310).

Author 309 can be said to have a derived skills footprint (DSF) 312 of subjects A and B. For example, subject matter A can be mountain biking, and subject matter B can be car parts. Author 309 may be a maven, or at least has shown expertise or skill in discussing both mountain bikes and car parts. The author is recognized as such, automatically by the system from an analysis of the author's white papers, letters, presentations, posts, blogs, tweets, emails, or other documents.

If another user wishes to know about mountain biking or car parts, an embodiment can help that user recognized that author 309 knows a great deal about the subjects. This can happen automatically in response to a search.

A "semantic footprint" of a document includes keywords, entities, annotations, and other content information of a document, whether or not tagged to the document. A semantic footprint of a document can be obtained or measured in various ways. A semantic footprint can be illustrated in various ways.

Figure 4:
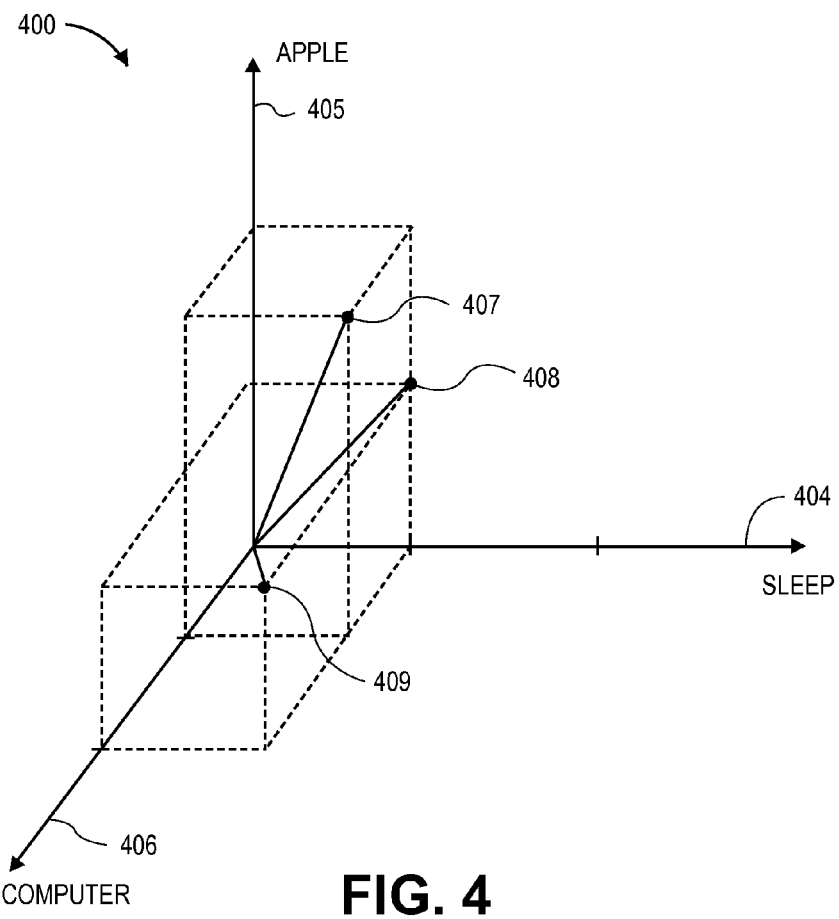
FIG. 4 illustrates a semantic footprint in accordance with an embodiment.

FIG. 4 illustrates simple semantic footprints in accordance with an embodiment. Each semantic footprint is represented by 3-D chart 400, which plots the number of particular keywords in a passage. Each of the orthogonal axes on the chart represents a particular keyword. Axis 404 represents "sleep," axis 405 represents "apple," and axis 406 represents "computer."

Query 401, "My Apple computer does not want to go to sleep. Is there an Apple manual that I could read?", has one instance of the word "sleep," two instances of the word "Apple," and one instance of the word "computer." Expressed as coordinate (<sleep>, <apple>, <computer>), the semantic footprint can be represented as (1, 2, 1). On the chart, the semantic footprint is shown as point 407. A radial line from the origin is shown to aid in visualization.

Query 402, "Can I sleep underneath an apple tree?", has one instance of the word "sleep," one instance of the word "apple," and no instances of the word "computer." The semantic footprint can be expressed as (1, 2, 0). On the chart the semantic footprint is shown as point 408.

Query 403, "Whenever my computer goes to sleep, it crashes. It's an Apple computer." has one instance of the word "sleep," one instance of the word "apple," and two instances of the word "computer." The semantic footprint can be expressed as (1, 1, 2). On the chart the semantic footprint is shown as point 409.

Additional dimensions, although more difficult to picture in a drawing figure, can easily be represented by additional numbers in a coordinate. For example, if a fourth dimension represents the keyword "crashes," then a semantic footprint for query 403 can be expressed as (1, 1, 2, 1). Any number of dimensions can be tracked and stored in a computer. Furthermore, dimensions may or may not be orthogonal to each other.

Other ways of determining semantic footprints can be used. For example, besides keyword searching, uniform resource identifiers, metatags, and entity extraction can be used. Entity extraction can extract an entity from a document, such as a person, location, time, currency, amount, product, company, etc., or other entities as known by those skilled in the art.

FIG. 5 illustrates a determination of an authority of a subject in accordance with an embodiment. Two authoritative authors are shown for two different subjects.

Author 501 has authored documents 502, 503, and 504. Each document is determined to have semantic footprints 505, 506, and 507, respectively. The logical, Venn-diagram intersection of semantic footprints 505, 506, and 507 is determined as intersection 508. Intersection 508 can also be called a "derived skills footprint." The intersection can be determined graphically, such as by a volumetric method in a multi-dimensional coordinate system. The intersection can be determined in other ways as well.

The intersection of the semantic footprints is associated with author 501, deeming author 501 as an authority of the overlapping subject matter. The association can be made by simply storing an identifier of the author (e.g., his or her name) along with the semantic footprint intersection in a database. The semantic footprint is a computer-understandable way of quantifying the metes and bounds of information and can be used at almost any level of abstraction. For example, if an author has posted blogs about General Motors car parts, Saturn car parts, and Chrysler car parts, then it is determined that the overlapping subject matter in the blogs is about car parts. Thus, the author can be deemed an authority or expert on car parts.

Similarly to author 501, second author 511 has authored documents 512, 513, and 514. Each document is determined to have semantic footprints 515, 516, and 517. The logical intersection of semantic footprints 515, 516, and 517 is determined as intersection 518. Intersection 518, also a derived skills footprint, is associated with author 511 in the system.

Once the subject matters, or derived skills footprints, are assigned to the authoritative authors, another user's query can be matched up with one of the authoritative author using their derived skills footprints.

In some embodiments, the matchings can be used to assign user questions to particular authorities. For example, a manager of a customer support department can use an engine to assign, automatically, questions to his employees. For example, if a customer has written in to ask about a strange clicking sound upon start up of her residential air conditioning unit, an employee who has dealt with and wrote the most about clicking sounds upon startup of the company's air conditioning units can be automatically assigned the problem.

Figure 6A:
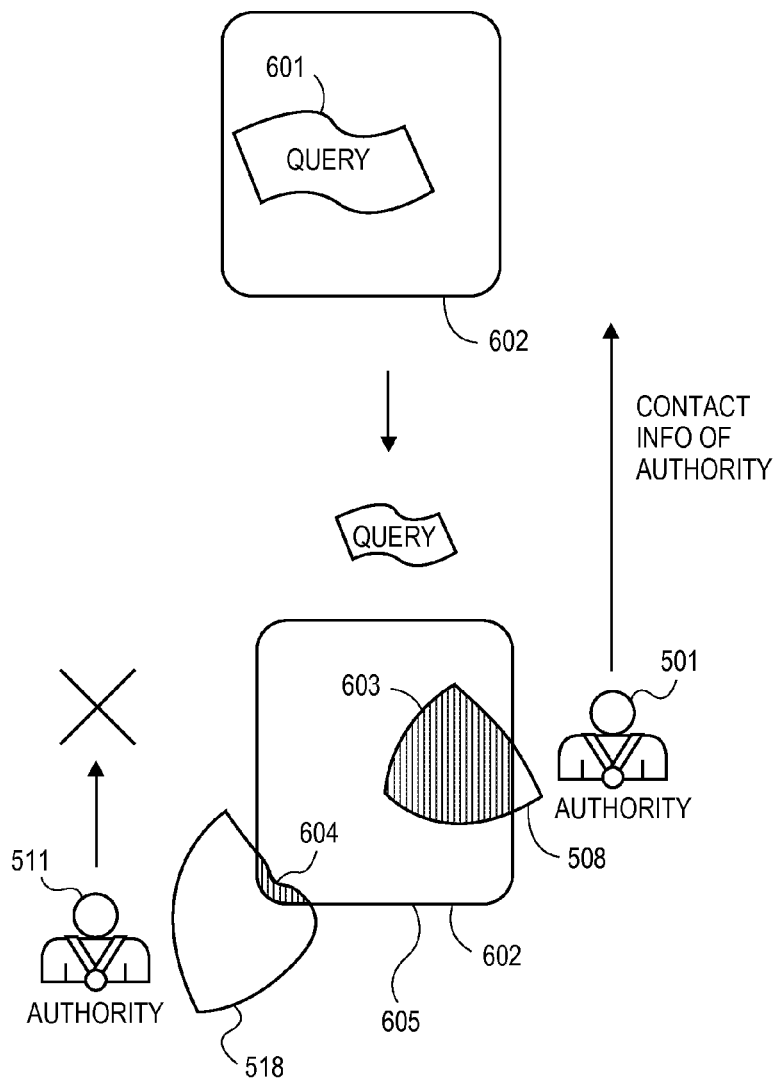
FIG. 6A illustrates a match of an authority to a query in accordance with an embodiment.

FIG. 6A illustrates a match of an authority to a query in accordance with an embodiment. Query 601 is determined to have semantic footprint 602. This determination can be made by the same algorithm that determines the semantic footprints of the documents. The semantic footprint of query 602 can then be compared with the derived skills footprints of the authors.

The intersection of query 602 with derived skills footprint 508 is determined to be intersection 603. Meanwhile, the intersection of query 602 with derived skills footprint 518 is determined to be intersection 604.

The extent of overlap between intersection 603 and the query is large, as indicated by the figure. Therefore, the contact information of authority 501 is sent to the querying user. The amount of overlap between intersection 604 and the query is relatively small. Therefore, the contact information of authority 511 is not sent to the querying user. In some embodiments, only the top one, two, three, or more authorities whose derived skills footprints overlap the semantic footprint of the query are sent to the querying user. In other embodiments, contact information for all authorities whose derived skills footprints are greater than or equal to a given threshold are returned.

Figure 6B:
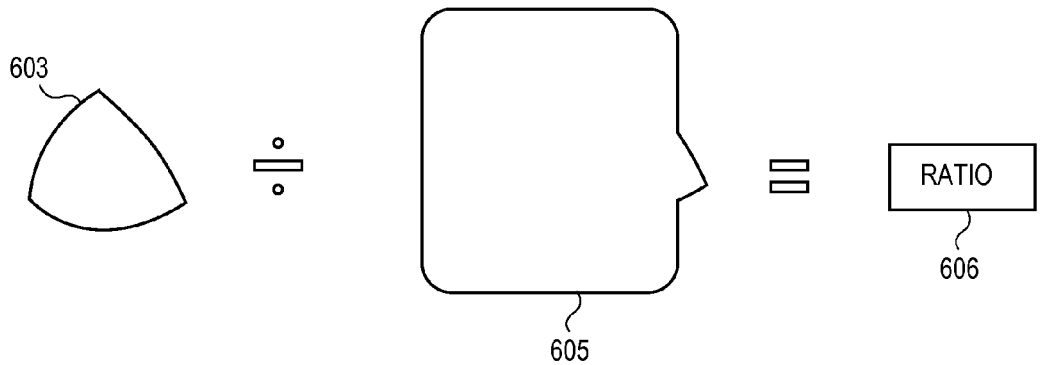
FIG. 6B illustrates a calculation of an overlap ratio in accordance with an embodiment.

FIG. 6B illustrates a calculation of an extent of an intersection, in this case an overlap ratio, in accordance with an embodiment. Intersection 603 is divided by union 605 of derived skills footprint 508 and query 602 to calculate ratio 606. If the ratio is above, for example, 90%, then authority 501's contact information is sent to the querying user. A ratio can also be calculated by dividing intersection 604 by a union of derived skills footprint 518 and query 602. If the ratio is below the threshold, then authority 511's contact information is not sent to the querying user.

An alternate ratio can be calculated as the ratio of intersection 603 or intersection 604 divided by query semantic footprint 602 instead of using unions.

Figure 7:
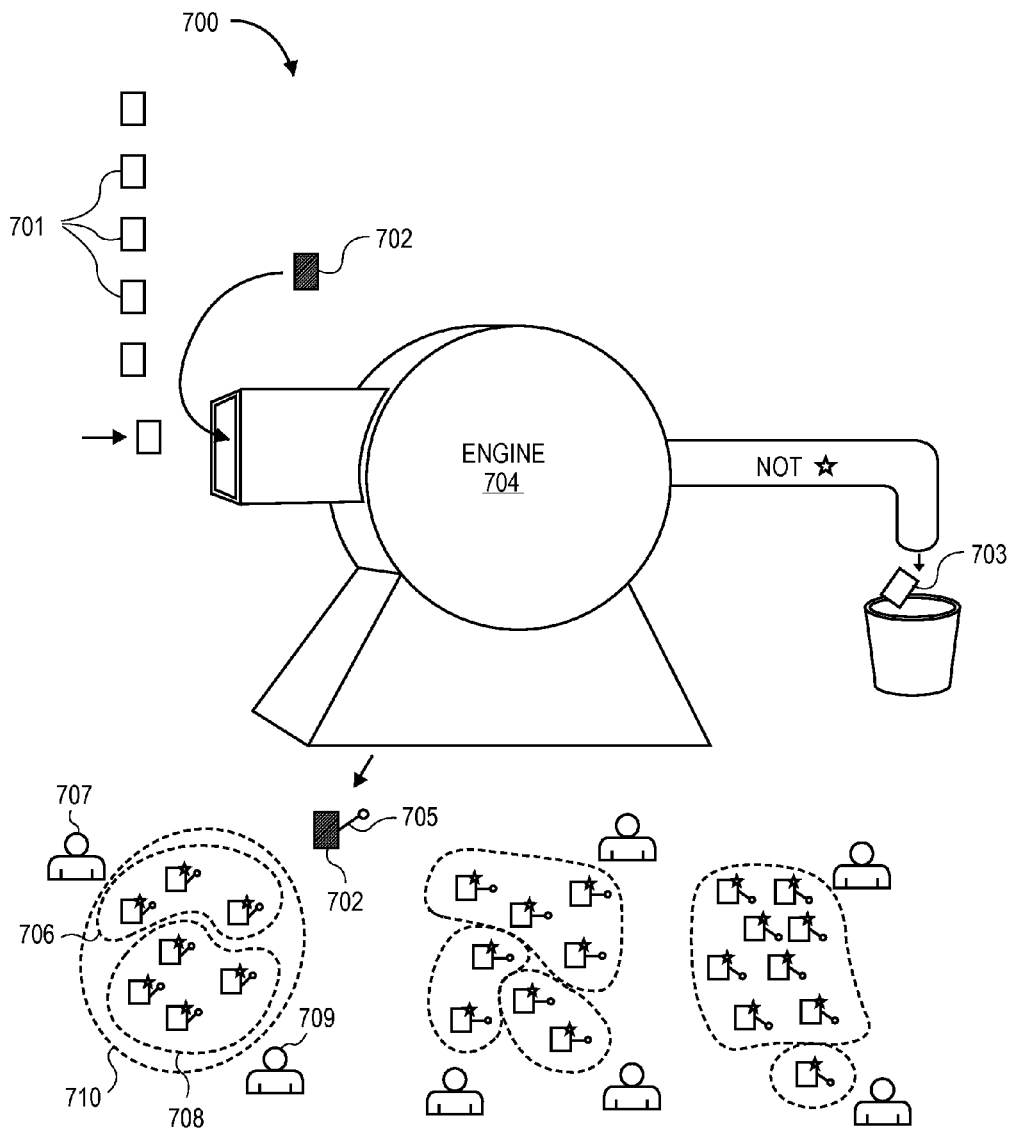
FIG. 7 illustrates an engine for determining an authoritative author of a subject in accordance with an embodiment.

FIG. 7 illustrates an engine for determining an authoritative author of a subject in accordance with an embodiment. In process 700, engine 704 crawls documents 701 and analyzes user usage data to determine whether the documents are popular, seminal, or otherwise highly rated. If they are not, then they are discarded and logged as non-highly rated, such as document 703.

If a document is highly rated, then its semantic footprint is determined, and it is clustered with like documents according to semantic footprint. For example, cluster 710 contains seven documents with similar semantic footprints. Of those seven documents, cluster 706 contains three documents that were written by author 707, and cluster 708 contains four documents written by author 709. Other documents can be similarly clustered and associated with their respective authors.

In the exemplary embodiment, query 702 is input into the same engine as that which is used to determine the semantic footprints of documents. Engine 704 does not determine whether query 702 is popular. Engine 704 does determine the semantic footprint of query 702, calculated as semantic footprint 705. Semantic footprint 705 of query 702 is most closely associated with semantic footprints of documents in cluster 710. More specifically, semantic footprint 705 is most closely matched with semantic footprints of documents 706 authored by author 707. Thus, the name of author 707 is returned on the results page to the querying user.

Figure 8A:
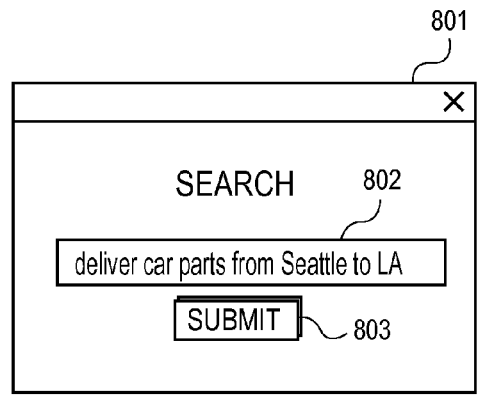
FIG. 8A illustrates a search page in accordance with an embodiment.

FIG. 8A illustrates a search page in accordance with an embodiment. In search page 801, a user types a query, "deliver car parts from Seattle to L.A.", in textbox 802 and clicks submit button 803.

Behind the scenes, the query's semantic footprint is determined and matched with derived skills footprints of authors. The names, email links, or other contact information is then sent to the user's browser window.

Figure 8B:
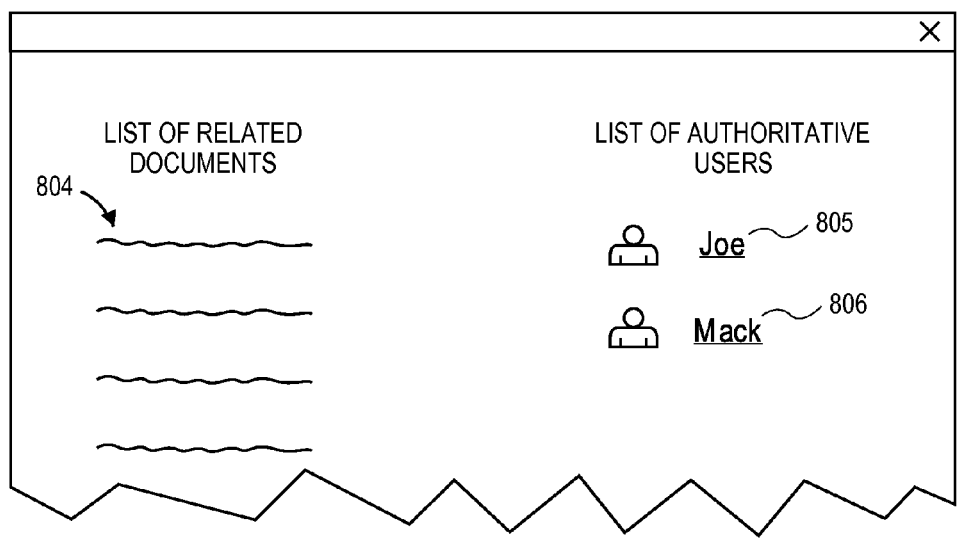
FIG. 8B illustrates a results page for the query of FIG. 8A in accordance with an embodiment.

FIG. 8B illustrates a results page for the query of FIG. 8A in accordance with an embodiment. Authoritative authors "Joe" and "Mack" have been identified. They know delivery of car parts. Links 805 and 806 are provided to Joe and Mack respectively. The user can read the list of related documents to find information on how to deliver car parts from Seattle to Los Angeles, and/or the user can simply click on Joe or Mack's links to send the query directly to them.

In some embodiments, clicking the contact link starts to compose an email to the authority. The email may be pre-filled with the user's query or last few queries.

Figure 9:
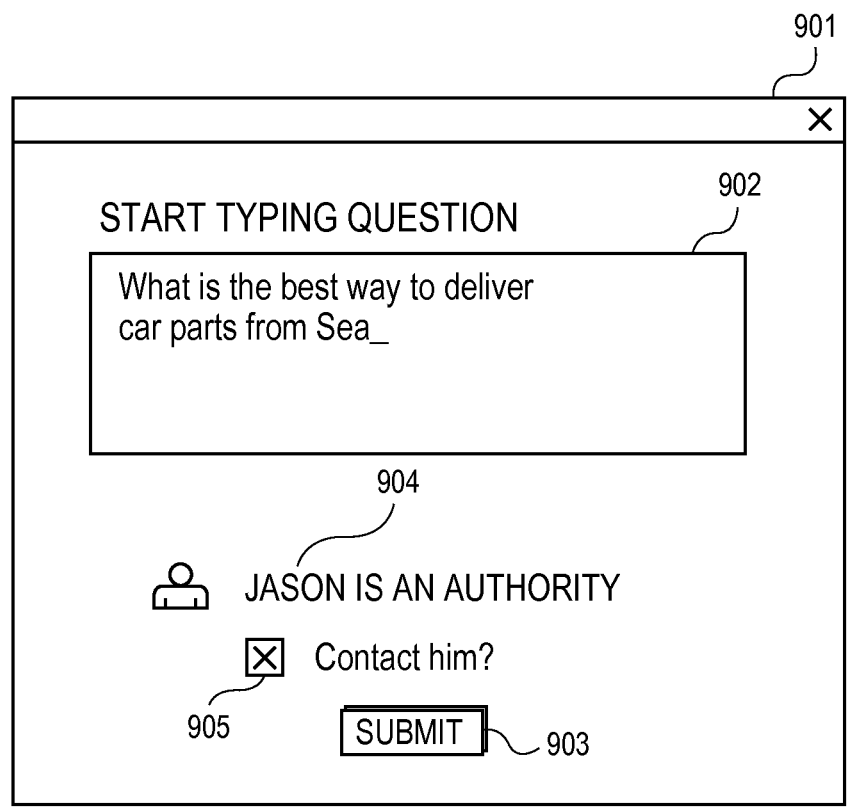
FIG. 9 illustrates an active query page in accordance with an embodiment.

FIG. 9 illustrates an active query page in accordance with an embodiment. In active query page 901, a user begins to type a query (i.e. "What is the best way to deliver car parts from Sea_") in multi-line textbox 902. While the user is typing, the query is analyzed for its semantic footprint. That semantic footprint is compared with the derived skills footprints of users. Before the user has finished his sentence, active query page 901 automatically refreshes to show "Jason" as an authority. Jason can be automatically contacted if checkbox 905 is left checked and submit button 903 is clicked. In this way, an authority on a subject can be directly contacted through automated means, sometimes surpassing the speed at which a question can be typed in.

Figure 10:
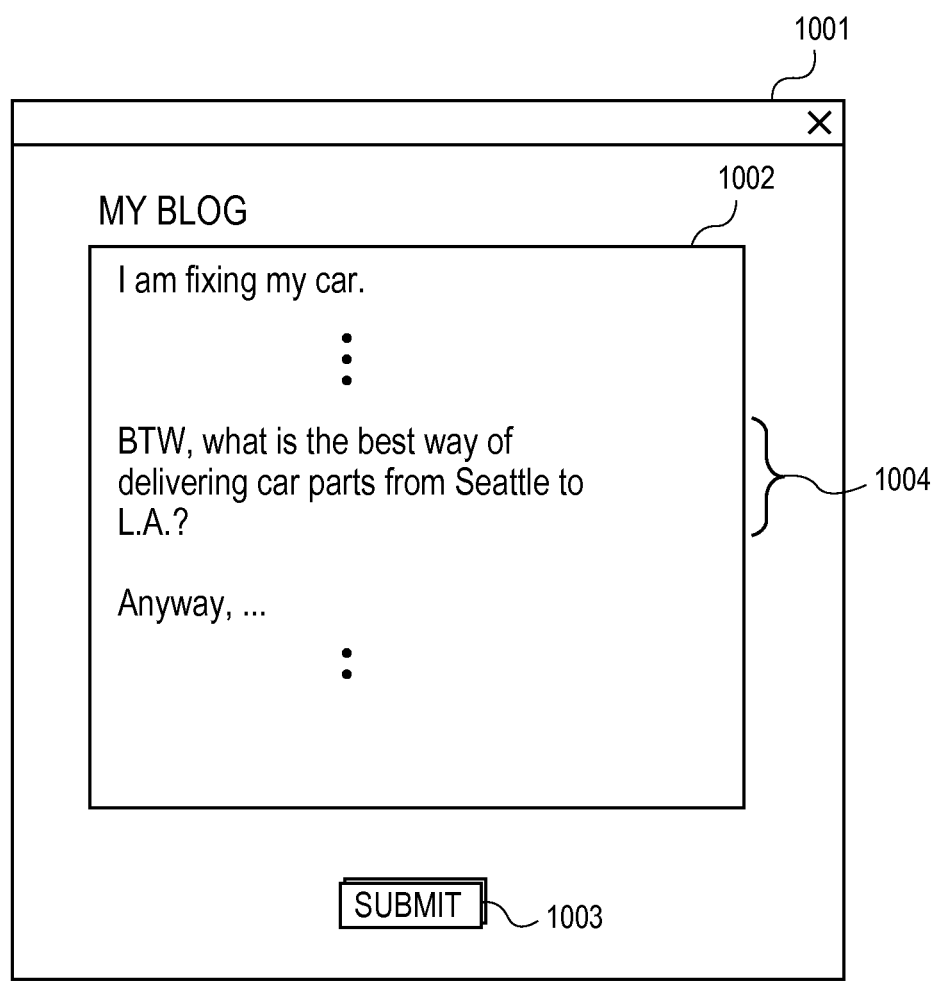
FIG. 10 illustrates a question in a web log in accordance with an embodiment.

FIG. 10 illustrates a question in a web log in accordance with an embodiment. In web log 1001, a user composes his or her blog in multi-line textbox 1002 and submits it by pressing submit button 1003. In the content of the blog, the user may pose inline question 1004, such as "BTW, what is the best way of delivering car parts from Seattle to L.A.?" In the exemplary embodiment, this query, or the entire blog, is analyzed to determine its semantic footprint. Its semantic footprint is compared with derived skills footprints of authoritative authors, and relevant authors are determined. The author names can be sent to the blogger before the blog is posted.

Figure 11:
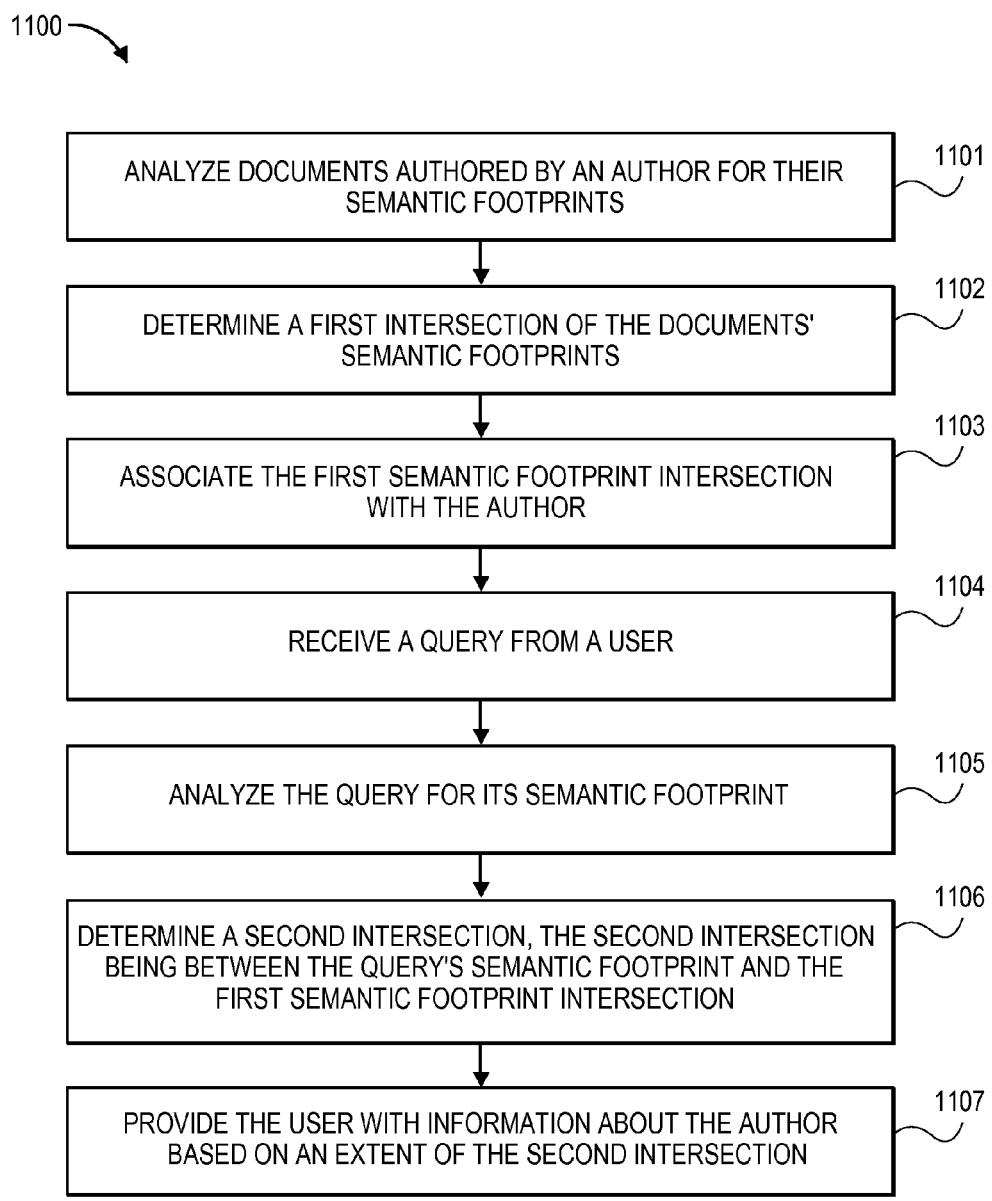
FIG. 11 is a process diagram in accordance with an embodiment.

FIG. 11 is a flowchart illustrating a process in accordance with an embodiment. Process 1100 can be automated in a computer or other machine and can be coded in software, firmware, etc. In operation 1101, documents authored by an author are analyzed for their respective semantic footprints. In operation 1102, a first intersection of the documents' semantic footprints are determined. In operation 1103, the first semantic footprint intersection is associated with the author. In operation 1104, a query is received from a user. In operation 1105, the query is analyzed for its semantic footprint. In operation 1106, a second intersection is determined, the second intersection begin between the query's semantic footprint and the first semantic footprint intersection. In operation 1107, the user is provided with information about the author based on an extent of the second intersection.

Figure 12:
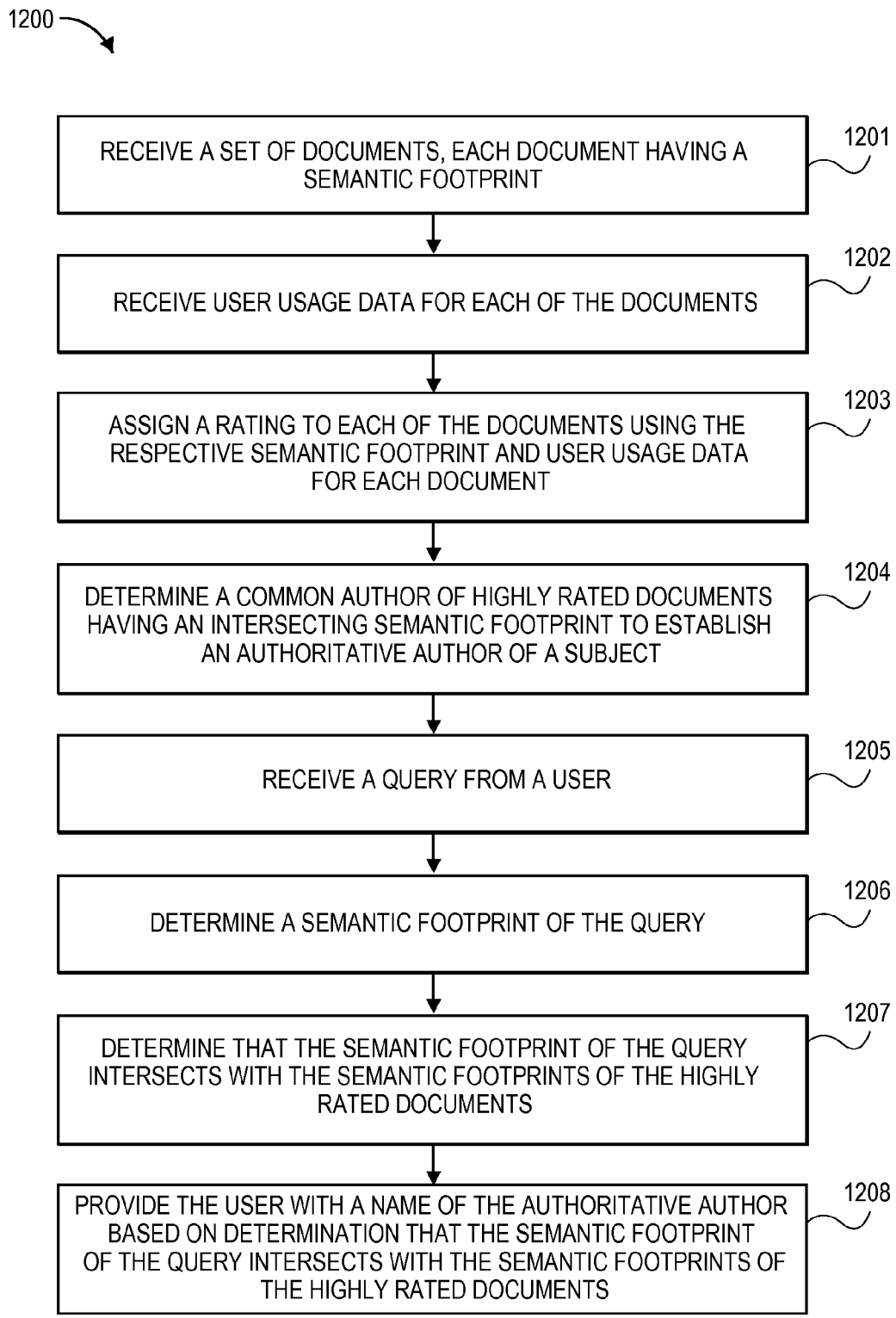
FIG. 12 is a process diagram in accordance with an embodiment.

FIG. 12 is a flowchart illustrating a process in accordance with an embodiment. Process 1200 can be automated in a computer or other machine and can be coded in software, firmware, etc. In operation 1201, a set of documents are received, each document having a semantic footprint. In operation 1102, user usage data for each of the documents in the set is received. In operation 1103, a rating is assigned to each of the documents using the respective semantic footprint and user usage data for each document. In operation 1104, a common author of highly rated documents having an intersecting semantic footprint is determined to establish an authoritative author of a subject. In operation 1205, a query is received from a user. In operation 1206, a semantic footprint of the query is determined. In operation 1207, it is determined that the semantic footprint of the query intersects with the semantic footprints of the highly rated documents. In operation 1208, the name of the authoritative author is provided to the user based on a determination that the semantic footprint of the query intersects with the semantic footprints of the highly rated documents.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of recommending an authority on a subject, the method comprising:

analyzing a plurality of documents for each of a plurality of authors to determine their semantic footprints;

assigning a rating to each of the plurality of documents based upon the respective semantic footprints and usage data associated with each of the plurality of documents;

determining, using a processor communicatively coupled to a memory, an author of highly rated documents having a intersecting semantic footprint to establish a subject of authority for the author, the processor determining which documents are highly rated documents based upon the usage data associated with each of the plurality of documents;

associating the intersecting semantic footprint with the author;

receiving a query from a user;

analyzing the query for its semantic footprint;

determining when the semantic footprint of the query intersects the intersecting semantic footprint associated with the author;

determining the extent of the intersection between the semantic footprint of the query and the intersecting semantic footprint associated with the author based upon a ratio of a union of the semantic footprint of the query and the intersecting semantic footprint associated with the author; and providing, when the semantic footprint of the query intersects the intersecting semantic footprint associated with the author, the user with contact information for the author, wherein each semantic footprint is a multi-dimensional coordinate based on one or more keywords, entities and annotations, and wherein each semantic footprint is determined based upon a volume of overlapping areas of the respective multi-dimensional coordinates.

2. The method of claim 1 wherein each intersection is determined by a common algorithm.

3. The method of claim 1 wherein the operations are performed in the order as shown.

4. The method of claim 1 wherein each operation is performed by the computer processor communicatively coupled to the memory.

5. The method of claim 1, wherein the query is an active query and the method further comprises:

analyzing the active query for its semantic footprint in real time; and refreshing the information about the author based on an extent of the second intersection in real time as the user is entering the active query.

6. A method of determining an authoritative author on a subject, the method comprising:

receiving a set of documents for each of a plurality of authors, each document having a semantic footprint;

receiving user usage data for each of the documents;

assigning a rating to each of the documents using the respective semantic footprint and user usage data for each document;

determining, when one of the plurality of authors has a plurality of highly rated documents, an intersecting semantic footprint of the plurality of highly rated documents to establish that the one of the plurality of authors is an authoritative author of a subject, determining which documents are highly rated documents is based upon the usage data associated with each of the plurality of documents;

receiving a query from a user;

determining a semantic footprint of the query;

determining that the semantic footprint of the query intersects with the intersecting semantic footprint of the plurality of highly rated documents;

determining an extent of the intersection between the semantic footprint of the query and the intersecting semantic footprint associated with the author based upon a ratio of a union of the semantic footprint of the query and the intersecting semantic footprint associated with the author; and providing the user with contact information for the authoritative author based on a determination that the semantic footprint of the query intersects with the semantic footprint of the plurality of highly rated documents, wherein each semantic footprint is a multi-dimensional coordinate based on one or more keywords, entities and annotations, and wherein the intersecting semantic footprint is determined based upon a volume of overlapping areas of the respective multi-dimensional coordinates.

7. The method of claim 6 further comprising:

determining the semantic footprint for each document of the set of documents.

8. The method of claim 7 wherein determining the semantic footprint for each of the set of documents and determining the semantic footprint of the query are performed by a common algorithm.

9. The method of claim 6 wherein the documents are selected from the group consisting of web pages, presentations, Microsoft Word documents, Adobe Acrobat Portable Document Format (PDF) documents, instant messages, tweets, and emails.

10. The method of claim 6 wherein the user usage data for each document is selected from the group consisting of ratings from users, a number of users who have viewed the document, and a number of links to the document.

11. The method of claim 6 wherein the operations are performed in the order as shown.

12. The method of claim 6 wherein each operation is performed by the computer processor communicatively coupled to the memory.

13. The method of claim 6, wherein the query is an active query and the method further comprises:

analyzing the active query for its semantic footprint in real time; and refreshing the name of the authoritative author in real time as the user is entering the active query.

14. A computer system executing instructions in a computer program, the computer program instructions comprising program code for performing the operations of:

receiving, by a processor, a set of documents for each of a plurality of authors, each document having a semantic footprint;

receiving, by the processor, user usage data for each of the documents;

assigning, by the processor, a rating to each of the documents using the respective semantic footprint and user usage data for each document;

determining, by the processor, when one of the plurality of authors has a plurality of highly rated documents, an intersecting semantic footprint of the plurality of highly rated documents to establish that the one of the plurality of authors is an authoritative author of a subject, determining which documents are highly rated documents based upon the usage data associated with each of the plurality of documents . . .

determining, by the processor, that the semantic footprint of the query intersects with the intersecting semantic footprint of the plurality of highly rated documents;

determining an extent of the intersection between the semantic footprint of the query and the intersecting semantic footprint associated with the author based upon a ratio of a union of the semantic footprint of the query and the intersecting semantic footprint associated with the author; and providing, by the processor, the user with contact information for the authoritative author based on a determination that the semantic footprint of the query intersects with the semantic footprint of the plurality of highly rated documents, wherein each semantic footprint is a multi-dimensional coordinate based on one or more keywords, entities and annotations, and wherein the intersecting semantic footprint is determined based upon a volume of overlapping areas of the respective multi-dimensional coordinates.

15. The computer system of claim 14, wherein the query is an active query and the computer program instructions further comprise program code for performing the operations of:

analyzing, by the processor, the active query for its semantic footprint in real time; and refreshing, by the processor, the name of the authoritative author in real time as the user is entering the active query.

* * * * *